United States Patent
Freed et al.

(10) Patent No.: US 12,547,403 B1
(45) Date of Patent: Feb. 10, 2026

(54) RESOURCE LEAK DETECTION AND RECLAMATION IN RUN-TO-COMPLETION EXECUTION SYSTEMS

(71) Applicant: Amazon Technologies, Inc., Seattle, WA (US)

(72) Inventors: Todd Freed, Woodinville, WA (US); David James Goodell, Seattle, WA (US); Schuyler David Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 18/410,130

(22) Filed: Jan. 11, 2024

(51) Int. Cl.
*G06F 9/30* (2018.01)
*G06F 16/22* (2019.01)

(52) U.S. Cl.
CPC ...... *G06F 9/30054* (2013.01); *G06F 9/30076* (2013.01); *G06F 16/2237* (2019.01)

(58) Field of Classification Search
CPC ........................................................ G06F 9/30
See application file for complete search history.

(56) References Cited

U.S. PATENT DOCUMENTS

| | | | | |
|---|---|---|---|---|
| 4,724,521 | A * | 2/1988 | Carron | G06F 15/177 379/91.01 |
| 9,058,424 | B1 * | 6/2015 | Bienkowski | G06F 11/3684 |
| 2003/0076329 | A1 * | 4/2003 | Beda | G06T 15/00 345/557 |
| 2006/0156418 | A1 * | 7/2006 | Polozoff | H04L 63/08 726/28 |
| 2013/0305094 | A1 * | 11/2013 | Hopley | G06F 11/3624 714/E11.208 |

* cited by examiner

*Primary Examiner* — Jae U Jeon
(74) *Attorney, Agent, or Firm* — Nicholson De Vos Webster & Elliott LLP

(57) ABSTRACT

Techniques for resource leak detection and reclamation are described. Application code executed by multiple processors is modified, during runtime, to insert an unconditional branch into the code leading to separate accounting code, which registers accesses to particular resources in a data structure. The unconditional branch is later removed and the data structure is analyzed to determine whether ones of the resources have been lost.

20 Claims, 11 Drawing Sheets

RESOURCE LEAK DETECTION AND RECLAMATION IN RUN-TO-COMPLETION EXECUTION SYSTEMS

BACKGROUND

Resource leaks are a type of resource consumption by a computer program where the program does not release resources it has acquired. This condition is normally the result of a bug in a program. Resource leaks are generally due to programming errors: resources that have been acquired must be released, but since release often happens substantially after acquisition, and many things may occur in the meantime (e.g., an exception being thrown or abnormal program termination occurs) it is easy for release to be missed.

Resource leaks can be a minor problem, generally not crashing the program, but instead causing some slowdown to the program or the overall system. However, they may also me major problems, for example, causing crashes—either the program itself or other programs—due to resource exhaustion. For example, if the system runs out of resources, acquisition requests fail. Resource leaks often go unnoticed in many circumstances, such as under light load and short runtimes, and these problems only manifest themselves under heavy system load or in systems that remain running for long periods of time. Resource leaks are especially a problem for resources available in very low quantities. Leaking a unique resource, such as a lock, is particularly serious, as this causes immediate resource starvation by preventing other processes from acquiring it.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for resource leak detection and reclamation. According to some examples, a reckoning technique is provided for detecting (and reclaiming) resource leaks in an on-demand basis and can be particularly beneficial for systems that perform run-to-completion processing, and/or where pausing the system is infeasible, such as in various types of networking equipment like routers, networking cards, etc.

In some examples, a reckoning (or accounting) process can be initiated (e.g., by an operator) to patch lifecycle management code for a resource in question, dynamically at runtime, to incorporate code that performs an accounting function. The results of these accounting operations, together with the time-bound imposed by run-to-completion, can allow for all instances of the resource to be classified as either in-use, available, or lost.

In some examples, when these reckoning processes are not active, the patch point in the lifecycle management code may be adapted to avoid degrading the performance of the system for its typical operation. For example, the patch point may include a single no-op instruction that is quickly skipped during regular periods of processing but can be replaced with a branch instruction (e.g., an unconditional branch such as a "jump") for the duration of the reckoning operation. This technique allows for the reckoning process to have near-zero overhead while it is not active, which is a critical property, because the lifecycle management code is typically part of the inner processing loop in such systems.

In some examples, these reckoning techniques also support a recovery function, whereby resources that have been determined to be "lost" are restored to the available state. This allows for resource leaks to be remediated in a live system-a capability that is normally not possible in such systems. For example, an efficient, high-speed index providing access to available objects can continue to be used while a reckoning process, potentially with a recovery, is underway due to the structure of the index and the construction of the system, allowing the system to continue actively working without significant disruption.

Accordingly, examples disclosed herein can detect and potentially recover resource leaks in run-to-completion type systems, with near-zero overhead during normal operation, and with very low overhead during the actual accounting.

Figure 1:
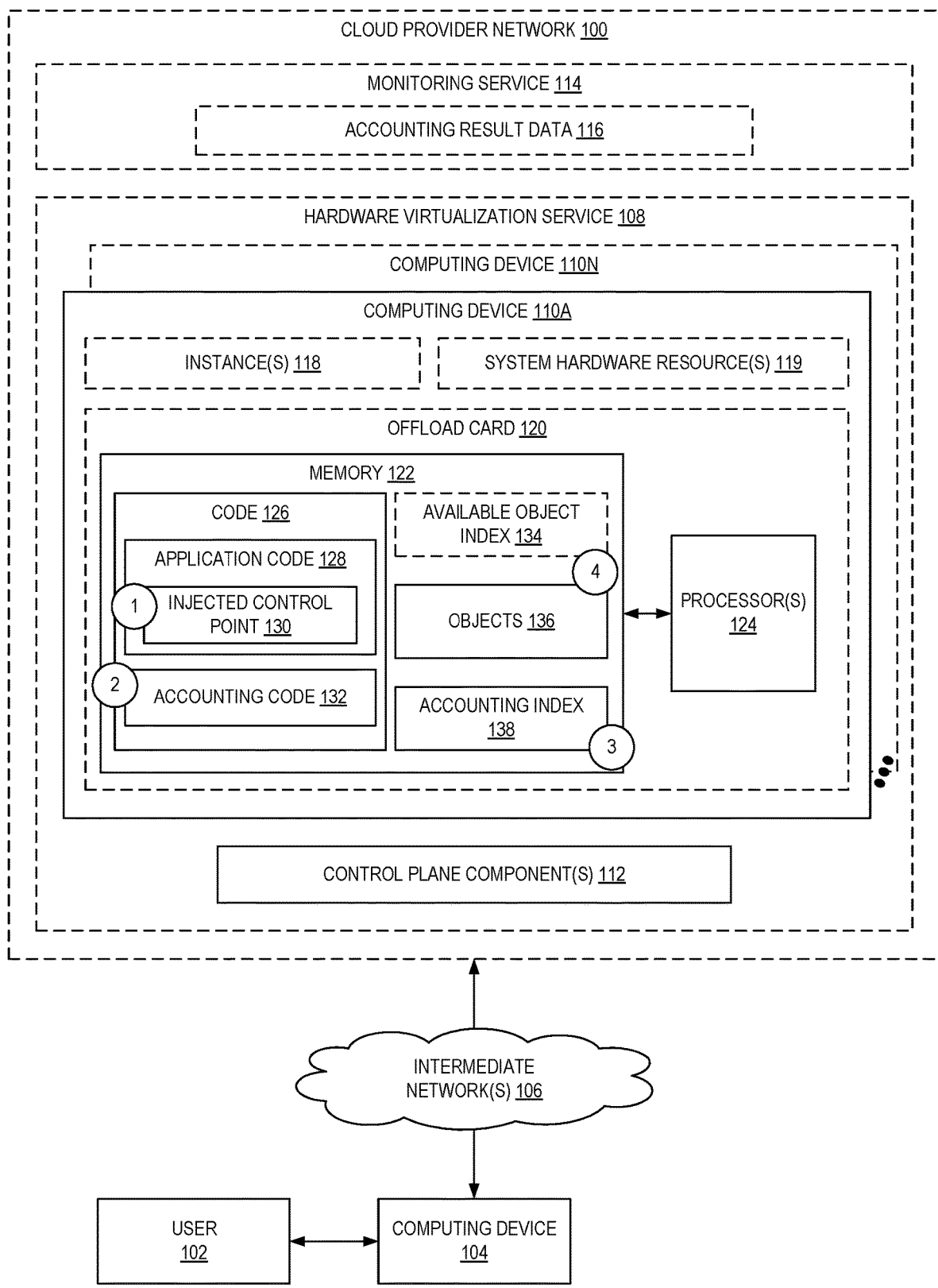
FIG. 1 is a diagram illustrating an environment for resource leak detection and reclamation according to some examples.

FIG. 1 is a diagram illustrating an environment for resource leak detection and reclamation according to some examples. This example environment including a cloud provider network 100 provides one of many useful deployment possibilities for the techniques disclosed herein.

A cloud provider network 100 (also referred to herein as a provider network, service provider network, etc.) provides users 102 with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service 108 that can execute compute instances, a storage service that can store data objects, etc. The users (or "customers") of cloud provider networks 100 can use one or more user accounts that are associated with a customer account, though these terms can be used somewhat interchangeably depending upon the context of use. Users 102 can also be managers or administrators of the cloud provider network 100 itself, who may similarly manage aspects from potentially remote locations across one or more intermediate networks 106. Cloud provider networks are sometimes "multi-tenant" as they can provide services to multiple different customers using the same physical computing infrastructure; for example, virtual machine instances may be concurrently hosted for different customers using a same underlying physical host computing device.

Users 102, through computing devices 104, can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane (e.g., implemented using one or more control plane components 112) of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components 112 are typically implemented on a separate set of servers from the data plane servers, and control plane traffic and data plane traffic can be sent over separate/distinct networks.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, one or more computing devices 110A-110N may include one or more processors 124 executing code 126 stored in a memory 122 (e.g., a Random-Access Memory (RAM) or similar) and may utilize resources/objects that may be subject to a memory leak, such as buffers in a set of objects 136. As used in this description, one type of object that may be utilized is a "buffer" object to store buffered data; however, other types of objects can be utilized with these described techniques and systems. In some examples, the processor(s) 124 and memory 122 may be implemented on an offload card 120 (e.g., a Peripheral Component Interconnect (PCI) type hardware "add-on" card coupled to the computing device), which may be separate from other processors, memory, etc., of the computing device 110 (illustrated as system hardware resources 119).

The computing device 110A may be one of many similar or identical computing devices 110A-110N implementing aspects of a service of the cloud provider network 100, such as a hardware virtualization service 108 that hosts instances (e.g., virtual machines) for its users. For example, the processor(s) 124 and memory 122 may be part of an offload card 120 of a computing device 110A that hosts instances 118 for users, where the offload card 120 may implement virtual machine management type functionalities, such as managing access, for the instances 118, to physical network interfaces (e.g., of the offload card 120, though not illustrated) for sending and receiving network traffic involving the instances 118. However, it is to be noted that aspects of the disclosed techniques and systems can be implemented in many other environments and configurations, such as in other run-to-completion environments, in symmetric multi-processing (SMB) systems, etc.

As reflected in the example system of FIG. 1, however, a cloud provider network 100 may be implemented using one or multiple data centers with computing devices 110A-110N configured to host virtualized compute instances 118 for its external users, or for the cloud provider network 100 itself in providing other services offered to its external users. In some hardware configurations, these computing devices 110 use network interfaces provided by use of an add-on offload card 120 (e.g., a PCI offload card) that executes firmware managed by the cloud provider network 100. In this manner, instances 118 can use a PCI function provided by the offload card 120, which may also, via the firmware, interact/communicate with the instances 118, perform underlying substrate networking (e.g., for determining how to reach other instances hosted by other computing devices, for determining how to reach and utilize the network).

Accordingly, in some examples, a driver in a "guest" instance 118 may interact with the firmware (e.g., application code 128) in the offload card 120. In some examples, instances 118 and the firmware communicate via exchanging buffers (a type of object) through a memory (e.g., in a ring configuration). As one example, to send a packet, an instance 118 may write data into buffer objects 136 to be sent, by the offload card 120, as one or more Internet Protocol (IP) packets. For performance, reads and writes to this portion of memory (forming the buffer objects 136) is governed by a protocol, or memory access pattern, that is followed by both the instance 118 driver and the offload card 120 firmware, and thus both will access the same part of memory (implementing the objects 136) according to a same scheme, which involves re-using and exchanging these buffer objects (e.g., in a circular ring).

In some examples, the instance 118 driver and the firmware may utilize a highly efficient available object index 134 data structure to be able to quickly identify available objects in this set of objects 136. Such an available object index 134 data structure can be implemented using a variety of types of data structures known to those of skill in the art, with a purpose of providing quick identification of buffer objects that are available for use, which can be crucial for performance reasons. For example, in the case of a system utilizing many buffer objects (e.g., 50,000 or more), it is infeasible to require a writer to first iterate through the buffer memory locations to search for an empty one, which would slow down the entire transmission process.

However, with such systems involving multiple readers and/or writers to a common area of memory 122, problems can arise. For example, in IP networking, when a sender wants to send a datagram that is too large to go across a link, the datagram may be split into fragments, which are sent separately (e.g., one at a time), each with an ordering identifier associated therewith so the recipient can reconstruct the original datagram. In some environments, entities on the network path (e.g., the offload card 120 or other forwarding elements such as switches, routers, and the like) often buffer all of those fragments (i.e., wait for all to arrive) and then transmit all of them at once. This pattern, which involves storing the data buffered somewhere else (e.g., in a fragment queue) for a period of time is quite common. To handle such buffering, a system may be configured with a timeout, such that any incomplete buffered data (associated with other fragments that have not arrived and may never arrive) may be "flushed" (deleted) if the entirety of the data is not received in some amount of time. However, a bug might exist in this code and the timeout isn't properly honored, resulting in incomplete buffered data remaining in the memory and never flushed and made available for use again. Similarly, other types of bugs may exist where objects 136 are utilized but are never let go of (and thus are "lost"), and thus this presents a memory leak where the amount of buffer space that is useable decreases over time. Regardless of the exact type of bug, the existence of such leaks can be extremely difficult to identify in practical implementations. For example, if there are 50,000 total buffer objects, but generally only 20,000 of them are used at a time, it may not be easy to detect that 10,000 have been lost because there are always buffer objects available when needed. Thus, this presents a further problem in that there can be a slow leak of critical resources that goes unnoticed for a long time. Moreover, if a bug exists that takes weeks or longer to fully manifest, you may not notice it at all (e.g., if the update cycle is faster than that), leaving the system vulnerable to not being able to handle a sudden burst of activity.

Techniques are disclosed herein to provide the ability to, in an on-demand manner, account for all of these objects, while they remain in use, in a way that doesn't disrupt the performance of the system. These techniques provide a substantial benefit in not needing to shut down the system during their operation—in many environments, it is not feasible to just stop everything to examine everything in the set of objects to determine if each is in use or not.

Moreover, these techniques can support multi-core, SMP-type systems, where multiple processors (e.g., CPU cores) are accessing a same memory. Over time, a single object can potentially be used by each of different cores in system, and from the perspective of the memory, accesses have to be made consistent across these processors, further complicating things.

In some examples, a user 102 or control plane component 112 may trigger a "reckoning" or accounting to be made for a computing resource, e.g., by sending a command to one or more processors 124 of a computing device 110A. One of the processor(s) 124 can thus modify application code 128 to cause those processors 124 executing the code 128 and using the buffer objects (e.g., objects 136) to make an accounting of the buffer objects while they use the buffer objects. For example, an injected control point 130 (shown with referenced to circle (1)) in the application code 128 can be modified, so that while ones of the processors 124 remain performing their regular processing operations, they are automatically caused to "trap" (or jump) into executing additional accounting code 132 (at circle (2)) reflecting their access to a buffer (of objects 136) in an accounting index 138 (at circle (3)). For example, the accounting index 138 may be a bitmap, where via the accounting code 132 the processor 124 utilizing a particular buffer (of objects 136) accounts for this use, perhaps by setting a bit in the accounting index 138 that corresponds to the buffer.

Upon a conclusion of the reckoning or accounting period of time, which can be configured with a duration long enough to ensure that each processor has performed a complete set of tasks (e.g., made it through a single loop of the application code 128, reflecting the performance of a discrete task), the accounting index 138 can be analyzed to identify which objects have not been accessed during this period of time. In some examples, this information may optionally be used to recover any lost or leaked objects (making them useable again), by determining which objects were not indicated as being used and ensuring that each of these objects is represented in the available object index 134 (as shown at circle (4))—e.g., inserting entries for un-used objects into this index 134 if and when they do not exist. Additionally, or alternatively, this usage information (from the accounting index 138) can be surfaced for visibility by other users or components, e.g., by sending accounting result data 116 (including a representation of the accounting index 138, such as a hash or compressed version thereof, or a listing of identifiers of unused objects) to a monitoring service 114 (e.g., Amazon CloudWatch™) of the cloud provider network 100 or back to a user 102, either directly in a "response" type message (responsive to a request to invoke a reckoning/accounting) or via a dashboard type interface (e.g., caused to be displayed by one or more control plane components 112).

Figure 2:
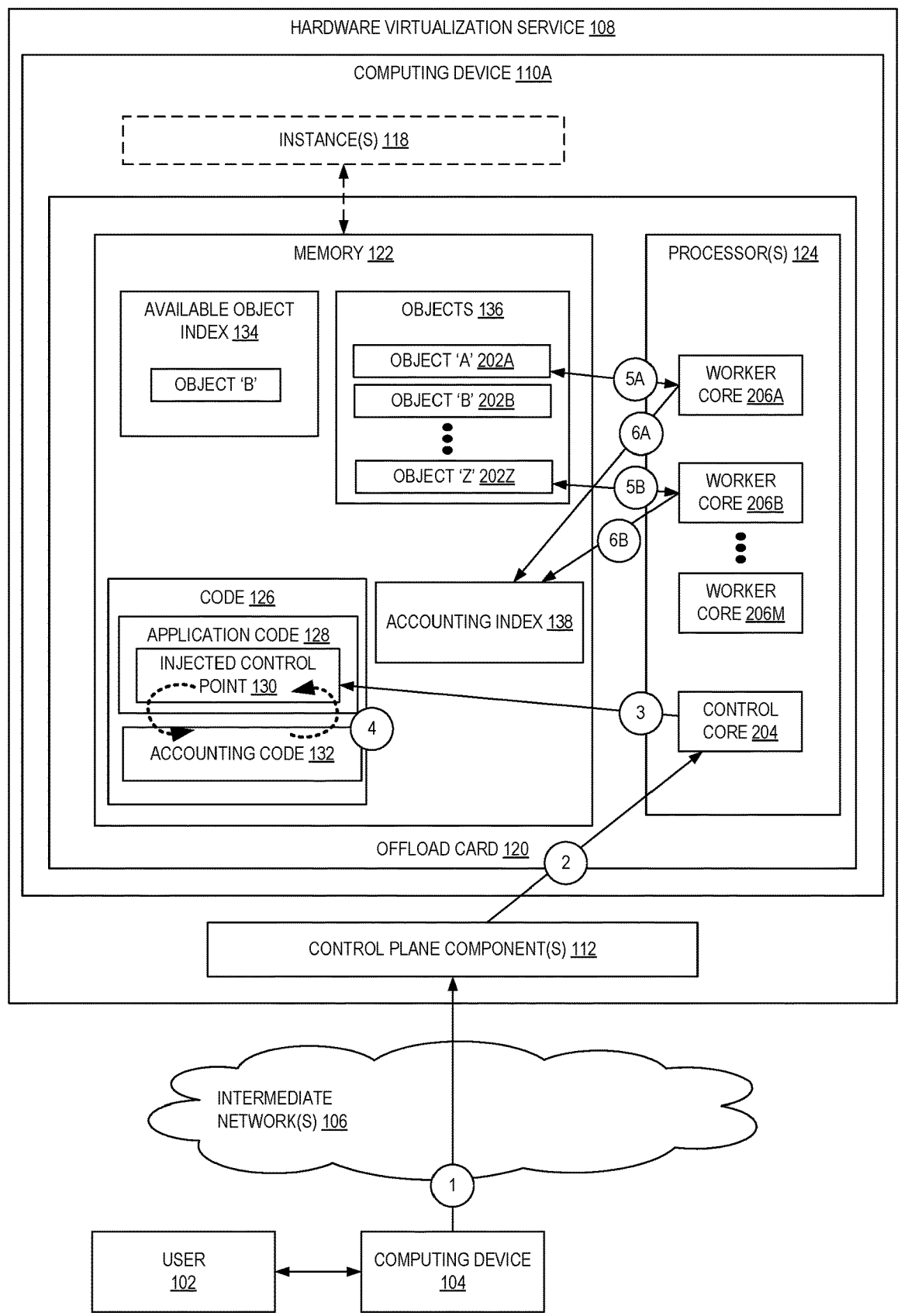
FIG. 2 is a diagram illustrating on-demand resource accounting through runtime application code modification according to some examples.

For further detail, FIG. 2 is a diagram illustrating on-demand resource accounting through runtime application code modification according to some examples. As shown with regard to circle (1), a user 102 (via use of a computing device 104) may interact with control plane components 112 providing a dashboard type application, console type application, etc., via a user interface or graphical user interface. For example, user 102 may be an administrator of the hardware virtualization service 108 and may monitor the status of the fleet of computing devices 110 that host instances 118 for its users. One part of this administration can include monitoring for performance-related issues such as the existence of bugs, memory leaks, and the like.

For any of a variety of reasons, the user 102 may wish to perform a reckoning of objects 136 of this computing device 110A (and potentially others), perhaps due to being presented via the application with a finding that some performance metric (e.g., packets processed per minute or second, actual bandwidth, etc.) is atypical for the computing device (or a fleet of multiple computing devices). Accordingly, the user 102 may cause the computing device 104 at circle (1) to transmit a request to perform a reckoning or accounting destined to one of the control plane components 112, which itself at circle (2) sends a request to the computing device 110A to be received by a control processor (control core 204) of the offload card 120. The control core 204 may be dedicated to handling requests for backend system operations, such as creating a virtual network involving instances hosted on the device, launching new instances on the device, changing security policies or rules on the device, or the like.

Alternatively, in some examples, the computing device 104 may send the request directly to the computing device 110A itself, potentially removing the control plane components 112 from being involved in this flow. Either or both of requests at circles (1) or (2) may include an "action" indicating that a reckoning is to be performed, allowing the recipient to determine what is requested to be done. One or both of these requests can be issued as an HTTP request, a Constrained Application Protocol (CoAP) request, or a request sent according to a similar protocol.

Further, the initiation of reckoning operations can occur on a different basis, such as being initiated by a control plane component 112 on a schedule (e.g., one time a day, once an hour), on an event-driven basis (e.g., a particular performance warning threshold being reached, as monitored by a monitoring service 114), or on a configured basis, such as after new software or firmware is deployed to the computing devices.

To begin the process, the control core 204 can cause, via circle (3), an injected control point 130 in the application code 128 to be modified to cause executors of the code to begin executing accounting code 132 at circle (4). In some examples, the control core 204 can activate a "probe" that will patch in the accounting code 132. The application code 128 in some examples is compiled with one or more probe sites embedded therein, where these probe sites are compiled into being a no-op instruction. When the control core 204 "activates" a probe site, this no-op instruction is quickly replaced with an unconditional branch instruction (e.g., a "jump" instruction) that directs execution to a location or label having accounting code 132 (that is not executed previously). Thus, the other worker cores 206A-206M that execute this application code 128 (e.g., a loop of instructions to be executed for performing one iteration of work as part of their typical operation), instead of finding a no-op instruction (and quickly skipping it) when accessing a particular buffer (e.g., buffer 202A), will encounter a jump type instruction leading it to accounting code 132. In this manner, during typical execution the single no-op instruction is quickly skipped by the worker core—which therefore doesn't impose a substantial penalty-but when the probe is "activated" each worker will quickly begin accounting via the accounting code 132, which itself can be efficiently written to impose only a very small performance penalty during activation.

Thereafter, the worker cores 206A-206M—which have remained operating throughout this process by executing the same application code 128 from the same memory 122—will begin trapping into the accounting code 132 when they access objects 136 due to the now-included unconditional branch instruction.

For example, worker core 206A may be executing portions of the application code 128 (e.g., just prior to the injected control point 130) to identify an object 202A (e.g., a buffer) for use (e.g., from the available object index 134), utilize the buffer 202A at circle (5A), and then reach the injected control point 130 to thus jump to accounting code 132, resulting in the accounting code 132 being executed, thereby causing an entry in the accounting index 138, at circle (6A), to be updated to reflect the use of the object 202A. Notably, the particular order of these operations can be modified in other examples, such as by identifying an object first, recording the imminent access via execution of the accounting code 132, and then utilizing the object thereafter. Likewise, at a similar point in time—and perhaps at least partially in parallel with the just-described worker core 206A actions—a second worker core 206B may likewise identify an object 202Z (e.g., via use of available object index 134), utilize the buffer 202 at circle (5B), and record the access in the accounting index 138 at circle (6B) based on having executed the accounting code 132.

This accounting code 132 may be simply constructed to, for example, identify a particular accounting index 138 entry (corresponding to an object 202 to be used) based on an object identifier known to be in a particular register and then update that accounting index 138 entry to reflect this access. For example, if there is a fixed pool of 50,000 objects 136, the accounting index 138 could be a 50,000 bit bitmap data structure. Thus, the accounting code 132 could identify which bit in the accounting index 138 corresponds to that particular one of the objects 136 (e.g., by subtracting the buffer address from the base address), and set that bit to a value of '1'. Thus, at the end, any bit in the bitmap that remains having a value of '0' is known to not have been accessed during the accounting time period, and thus either be an available but unused object, or a "leaked" object.

Figure 3:
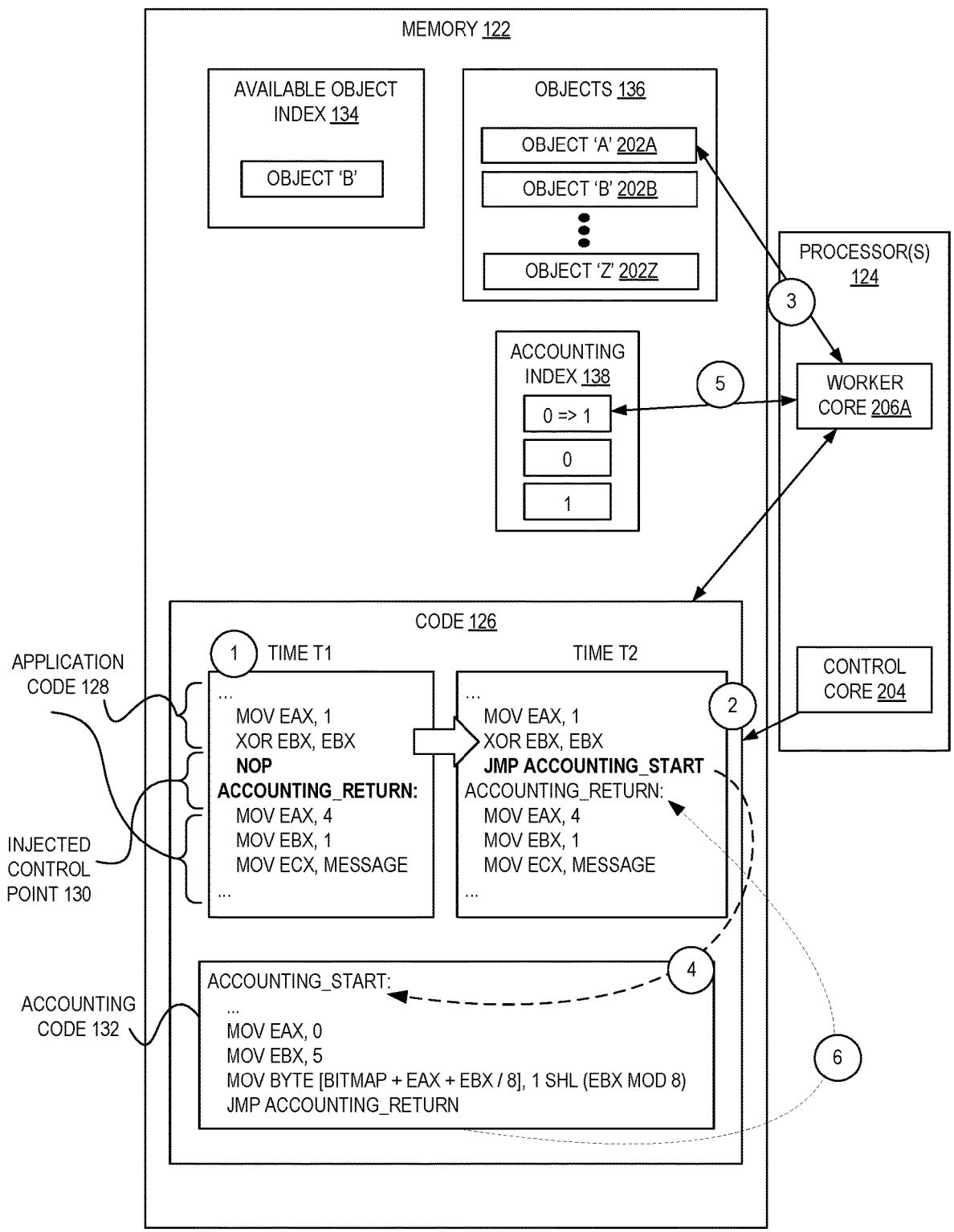
FIG. 3 is a diagram illustrating runtime application code modification according to some examples.

For a more specific lower-level explanation, FIG. 3 is a diagram illustrating runtime application code modification according to some examples. As shown, at a first point in time (time T1) reflected by circle (1), the application code 128 includes a number of instructions (shown in an assembly-like language for ease of understanding, though often represented in memory differently) including an injected control point 130 comprising a single no-op (or "no op") instruction, which is known to those of skill in the art as a single instruction that can be skipped by a processor. Note that all other code shown here, e.g., the "MOV" or "XOR" type instructions, is simply provided for the sake of understanding and may not reflect actual code, which is to be crafted specific to the particular environment and use case.

Upon the initiation of an accounting, the control core 204 at circle (2) can cause the injected control point 130 to be modified (e.g., by "activating" a probe) to replace the no-op (here, "NOP") instruction with an unconditional branch instruction (here, a "JMP") instruction causing control flow to jump to a portion of code labeled "ACCOUNTING_START". Thereafter, upon a next worker core 206A accessing an object 202A it will follow the jump instruction at circle (4) and continue executing the accounting code 132, leading to an accounting index 138 entry being changed from a value of "0" to a value of "1" by the worker core 206A at circle (5). Thereafter, the end of the accounting code 132 will have another unconditional branch instruction "jumping" back to a particular label or memory address associated with the end of the injected control point 130, and execution will continue normal operations, executing subsequent application code 128.

Notably, the reference to this accounting code 132 is enabled sufficiently long so that it is possible to observe when the worker cores 206 are touching objects. For example, at a beginning of a reckoning process, all bits in the accounting index are cleared by setting them to "0." Then, whenever a core uses an object (e.g., allocating and/or freeing it) the corresponding value in the accounting index is set to "1." This provides a "liveness" check, so the system can determine that one of the worker cores is, in fact, still using an object.

Accordingly, the accounting code 132 must be "enabled" or "activated" for a sufficient period of time to ensure successful operation. This time can be configured based on the particular type of computing system involved, the particular type of operations being performed via the application code 128, the tolerance for accommodating the slight overhead introduced by the accounting code, etc. For example, in some "realtime" type processing systems (e.g., medical systems) operations must be performed in a fixed amount of time, and thus the activation time period for the accounting may be set to that fixed amount of time, or just greater. In other type "run-to-completion" type systems, there may not be an upper bound for how long processing can take. In such systems, a best estimate time period can be used, and in some examples, together with a "keepalive" or "watchdog" type technique whereby users of a resource (e.g., a worker core "holding" an object) needing the resource for longer than a period of time are required to send a notification (e.g., a "keepalive") type message to a watchdog entity (e.g., the control core 204) indicating that it is still using the buffer (despite it not actively accessing it during a time period when the accounting is occurring), which is to occur at least once every (some defined) threshold amount of time, otherwise the buffer will get reclaimed.

Figure 4:
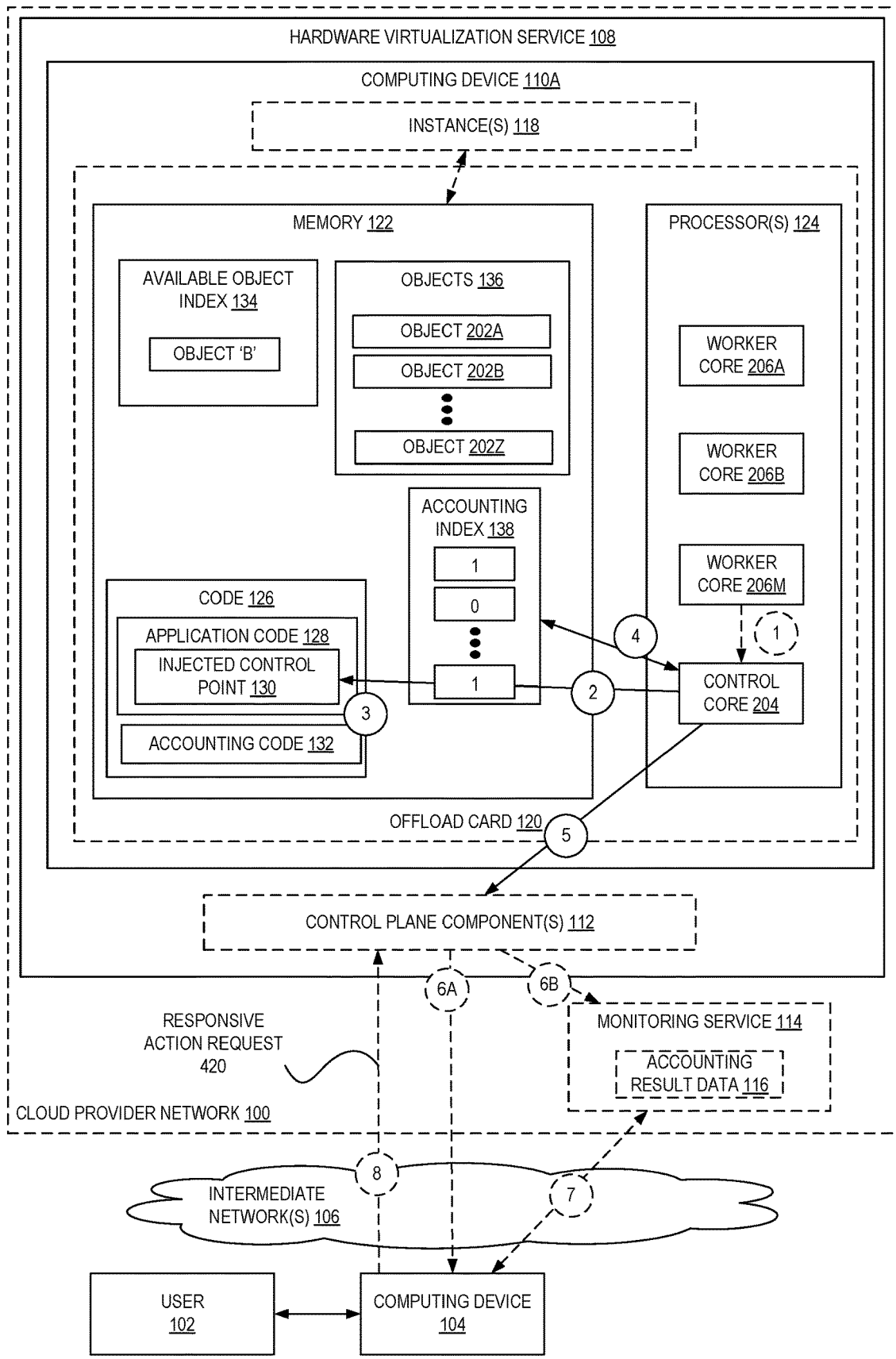
FIG. 4 is a diagram illustrating resource accounting termination and resource leak determination according to some examples.

Accordingly, FIG. 4 is a diagram illustrating resource accounting termination and resource leak determination according to some examples. In this example, as shown by circle (1), a worker core 206M may signal to the control core 204 (either directly, or via a memory-based communication technique) that it is utilizing a particular buffer (e.g., buffer 'Z' 202Z) via a keepalive or watchdog type message. In some such examples, the control core 204 may then access these objects itself during a reckoning operation to ensure that they remain visible as being utilized. Likewise, in some examples, the control core 204 may access the set of objects, if any, present in the available object index 134 and likewise access each of these objects, resulting in them appearing within the accounting index 138 as being utilized. Alternatively, the worker core 206M may simply "touch" this buffer (though not modify it) every threshold amount of time while it holds the buffer, which again would cause the accounting index 138 to be updated accordingly to reflect its use.

At the end of an accounting time period, as shown by circle (2), the control core 204 will "revert" the application code 128 to thereby cause the injected control point 130 to be returned to normal—e.g., remove the unconditional branch instruction by deactivating a corresponding probe. This can include simply replacing the in-memory instruction for the "jump" with a "no-op" instruction, as shown at circle (3).

The control core 204 may then obtain the accounting index 138 to determine the result of the accounting. In some examples, this may first include updating an index value (e.g., setting it to "1") for any value that was reported by another worker core, within the most recent threshold amount of time, according to a keepalive or watchdog type message, thus reflecting its use.

Thereafter, the control core 204 or another entity (e.g., control plane component 112, user computing device 104, monitoring service 114, or even user 102) can analyze the results of the accounting. For example, the control core 204 may generate a result based on this analysis of the accounting index 138 to be transmitted as a result to the control plane components 112 at circle (5), and/or directly or indirectly (via the control plane components 112) to the monitoring service 114 at circle (6B) as accounting result data 116, to the user computing device 104 at circle (6A), or the like. The result data may include metadata associated with the accounting, such as an indication of whether it was successfully performed, whether any buffers were found to be lost, a count of lost buffers, identifiers of lost buffers, etc. Alternatively, or additionally, the "raw" accounting index 138 can be sent, or another representation of this data can be sent, such as a list of all buffers that are in use, or all buffers that were not used, etc. For example, if all buffers were touched (e.g., all values in a bitmap are "1") during the course of the accounting, the control core 204 can send back a "success" type result message indicating that no buffers appear to be lost. As another example, if some buffers were not touched, but the control core 204 can verify that those buffers are not lost/marked as "available" (e.g., in the available object index 134), the control core 204 can also send back a "success" type result message indicating that no buffers appear to be lost.

This information can be presented by control plane components 112 (or monitoring service 114 at circle (7)) via the computing device 104 to the user, such as via a display on a dashboard type application, which could display these types of accounting results across a fleet of computing devices. In some cases, the user may thus interact with control plane components 112 to perform a responsive action (via sending a responsive action request 420 at circle (8)), such as halting a deployment of new code/software to the fleet of computing devices, "rolling back" (e.g., returning to an earlier version) of code/software used by the fleet of computing devices, etc. Further, in some examples the user 102 may also configure these or other actions to be automatically invoked, e.g., by configuring such an action to be performed or initiated on the user's behalf by the monitoring service 114 (or another service that uses the monitoring service 114, such as a serverless code execution service) upon its receipt of accounting result data 116 indicative of a leak.

The control core 204, in some examples, may also be able to work to "reclaim" lost buffers, when they are found. Because it could crash a system to free an object that has not in fact been leaked, recovery in some examples is only performed when a same set of objects is identified as lost over two separate reckoning operations. This can be done by returning a token to the user 102, which is passed in to start the second operation. The token encodes the set of lost objects. If the second operation computes the same token (or computes a token that is a superset of the lost objects from the first operation), and if recovery has been requested, then the lost objects can actually be freed.

Figure 5:
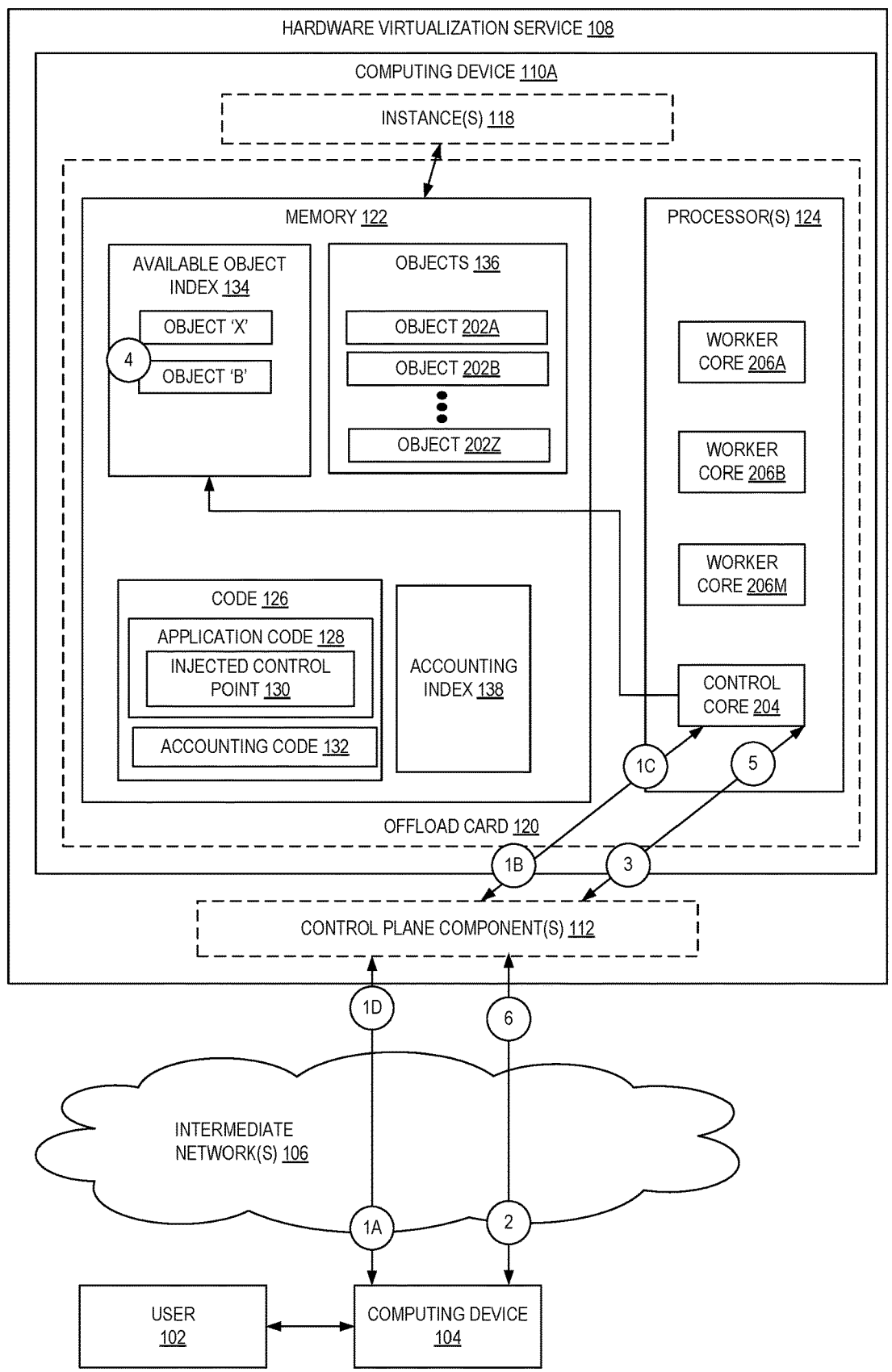
FIG. 5 is a diagram illustrating a dual accounting approach for resource leak detection and reclamation according to some examples.

For example, FIG. 5 is a diagram illustrating a dual accounting approach for resource leak detection and reclamation according to some examples. In some examples, to ensure that "lost" buffers are truly lost, a two-phase approach with confirmation is used. As shown via circles (1A)-(1D), an accounting can be initiated, performed, and a result returned (via circle (1D)) to the user computing device 104 indicating that at least one lost buffer was found. In this example, within the response (corresponding to circles (1C) and/or (1D)), a token can be returned. This token can be, for example, a hash taken over the state of the accounting index 138 at the conclusion of the accounting (e.g., a hash function, such as one from the SHA family, is used with the values of the accounting index as the input). In other examples, the token can be a hash taken over a list of buffer identifiers determined to be lost. In yet other examples, the token can simply be a list of identifiers of lost buffers.

In some examples, the user 102 may wish to reclaim the lost buffer(s), and cause, at circle (2), a subsequent request for an accounting with recovery to be transmitted. This request may include, in addition to an action indicating a request for an accounting, another argument indicating that recovery is to be performed, together with a copy of the token. This data can be provided via circle (3) to the control core 204, which may again perform an accounting.

At the conclusion of the accounting, the control core 204 may again generate a token based on the accounting index 138. The control core 204 may then compare the request-provided token (from the previous accounting response) with the just-generated token. If these tokens match, the control core 204 has now confirmed further evidence of the buffer(s) being lost, and thereafter, at circle (4), "reclaim" these lost buffer objects, here by inserting entries into (or otherwise updating) the available object index 134 for these buffers-in this example, an object 'X' and an object 'B' entry are inserted, and now may be utilized by subsequent worker cores 206 during typical processing operations. Thereafter, at circle (5), a new result can be generated and returned, indicating the result of the accounting (e.g., that buffer object 'B' and 'X' were determined to be lost) and further indicating a result of the reclamation (e.g., that the buffer objects were successfully added back into the available object index 134).

If the second accounting reveals a different set of lost objects, a result can be returned indicating which objects were found to be lost, if any, together with another corresponding token. In this case, the user 102 may attempt to again perform a combined accounting/reclamation thereafter using this latest token.

However, in some cases it may be the case that additional objects continue to be "lost" and thus the tokens would not match. In some examples, the returned token may thus encode or include a list of "lost" objects, and thus a second accounting returning this same list of objects along with other "newly-lost" objects could still perform a recovery of the initial list of objects by identifying the intersection of the two tokens. For example, if a first accounting found three buffer objects as lost ({1, 2, 10}) and the follow-up accounting found four buffer objects as lost ({1, 2, 5, 10}), in some examples the control core 204 can be configured to reclaim the overlapping buffer objects present in both-here, the three buffers ({1, 2, 10}).

Figure 6:
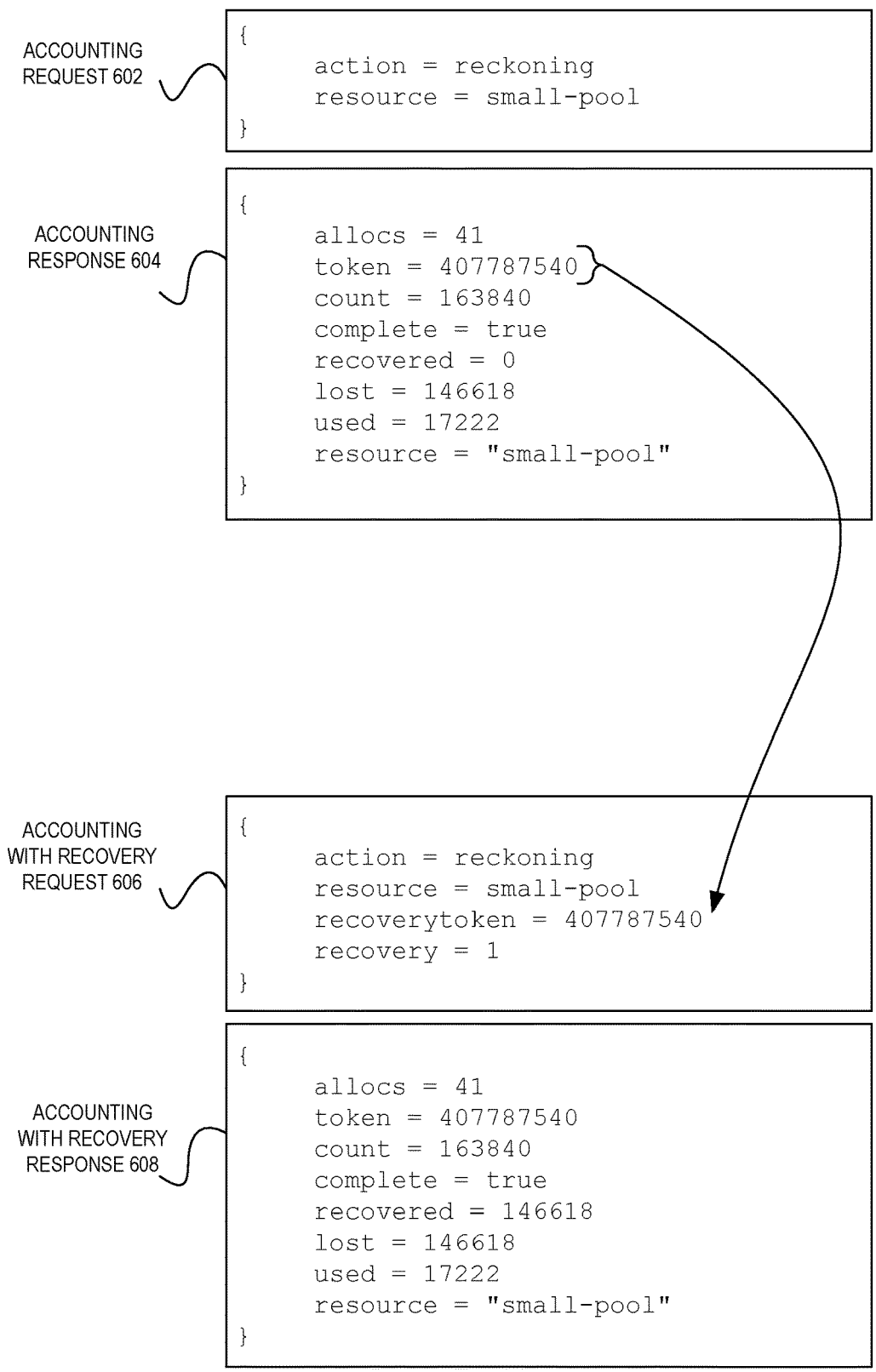
FIG. 6 is a diagram illustrating an accounting request and response as well as a follow-up accounting request seeking recovery with an associated response according to some examples.

FIG. 6 is a diagram illustrating an accounting request and response as well as a follow-up accounting request seeking recovery with an associated response according to some examples. As shown, a first accounting request 602 is shown including an "action" parameter with a value of "reckoning" indicating that an accounting is to be performed. This first accounting request 602 also includes a "resource" parameter with a corresponding value of "small-pool" that is used to identify which resources the accounting is to be performed on—e.g., a single computing device, a pool of computing devices (associated with the resource identifier "small-pool"), etc.

The corresponding accounting response 604 is shown with various result data, including a "token" generated based on the accounting index 138 (e.g., a hash or compressed version thereof), a "count" of buffer objects that exist (163840), a "lost" count of buffer objects determined to be lost (146618), a "used" count of buffer objects determined to be used during the accounting (17222), a "complete" value of true indicating that the accounting successfully completed, an "allocs" value of a number of new objects created, etc.

In this example, the token from the accounting response 604 is sent in a follow-up accounting with recovery request 606, which again provides an "action" of reckoning, a "resource" of the small-pool, a "recovery" parameter with a value of "1" indicating that recovery/reclamation is sought, and a "recoverytoken" parameter for the token.

In this example, the accounting and successful recovery did occur, as reflected by accounting with recovery response 608. Here, the same "token" value is provided in response, together with the same "count," "lost," and "used" values, demonstrating that the second accounting likely provided the same result as the first. This is ultimately confirmed via a "recovered" parameter with a value of 146618 indicating that all 146618 identified buffer objects were in fact recovered.

Figure 7:
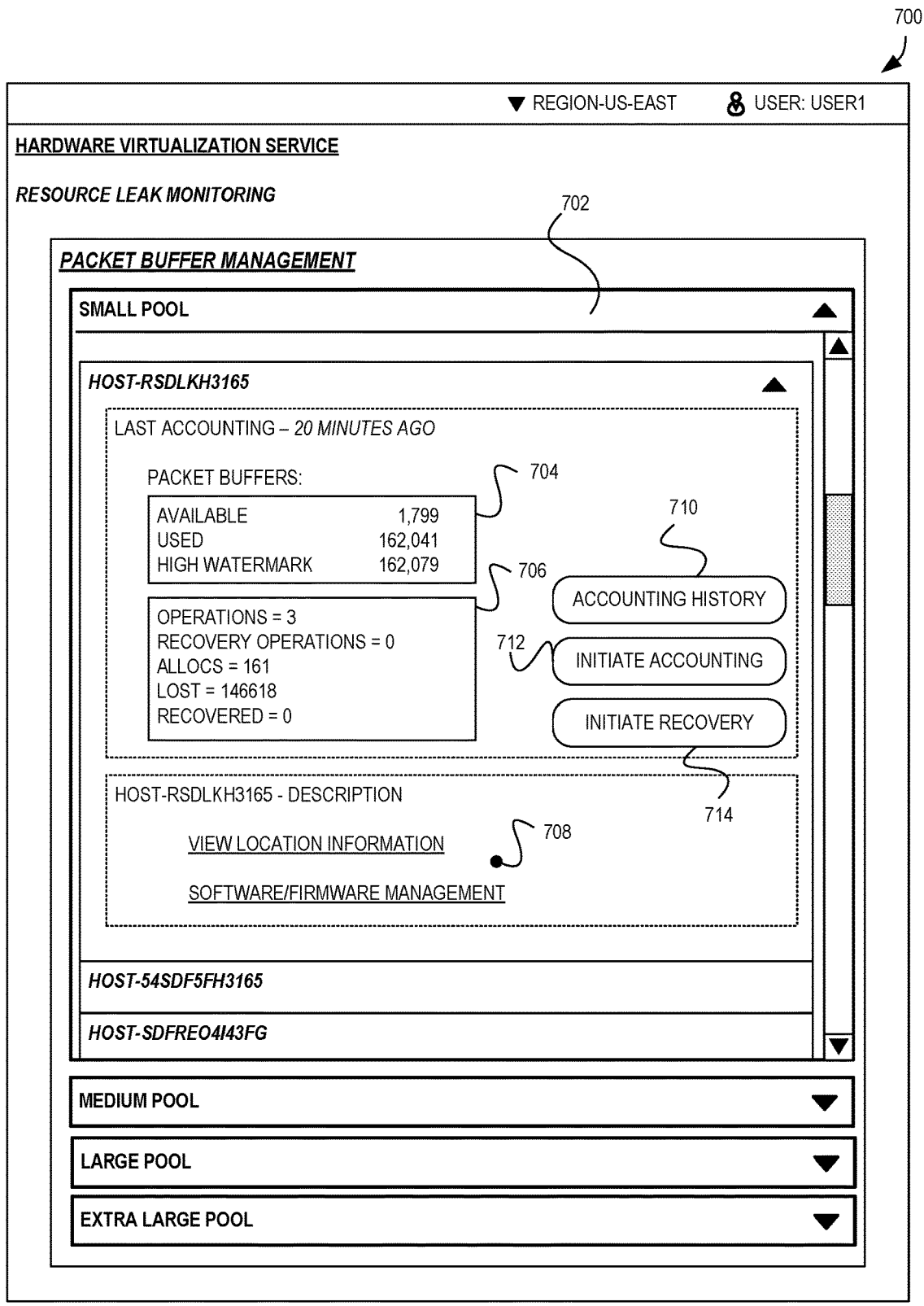
FIG. 7 is a diagram illustrating a user interface for resource leak detection and reclamation analysis according to some examples.

FIG. 7 is a diagram illustrating a graphical user interface 700 for resource leak detection and reclamation analysis according to some examples. As indicated above, in some examples results from these disclosed accounting operations can be used to provide a dashboard or monitoring type interface for users. For example, this graphical user interface 700 includes a section allowing users to explore accounting-related information across various resource groups—here, different "pools" (or collections) of computing devices, here including a "small pool" and a "medium pool" and the like. In this example, a user has expanded the user interface (UI) element 702 for the small pool, allowing the user to explore accounting results for individual computing devices within the pool. Here, a first computing device (referred to as "HOST-RSDLKH3165") has its associated data shown. First, a first UI element 704 provides a description of the packet buffers for the device, including a number available, used, and a high watermark, as obtained from a most recent accounting. Next, other details from a most-recent accounting are presented via UI element 706, identifying a number of lost buffer objects, recovered buffer objects, and the like. A UI input element 710 (here, a button) is provided allowing a user to select it and view more accounting information associated with other accounting runs (or, an "accounting history"), and another UI input element 712 (also a button) is provided allowing a user to initiate another accounting, which may generate an "accounting" request described herein. Finally, a UI input element 714 button is provided allowing a user to initiate a recovery (or reclamation) of lost buffer objects, which may generate an "accounting with recovery" request described herein. The interface further includes a section 708 providing a description associated with the host computing device, here providing a link to view location information (e.g., a map and/or location) for the host computing device, as well as a link to view or modify the software and/or firmware deployed to the device, potentially leading to another interface allowing for rollbacks, upgrades, and the like, which can be used to respond to a detected memory leak issue.

In some examples, backtrace data associated with lost objects can also be provided to requesting users or systems to aid in debugging and remediation. As is known to those of skill in the art, a backtrace can identify a sequence of function calls, etc., that are associated with a particular object or code that led to the current point. In some examples, when an object is accessed (e.g., via an "alloc" allocation) backtrace information can be captured and stored along with (or in association with) the object itself. Accordingly, in an accounting result indicating that an object leak is detected, the associated backtrace can be obtained and also returned, in a same result message or in a separate message or manner. Such backtrace information can be provided via such a GUI 700, allowing a user to learn more about how the object was last interacted with, created, or the like.

Figure 8:
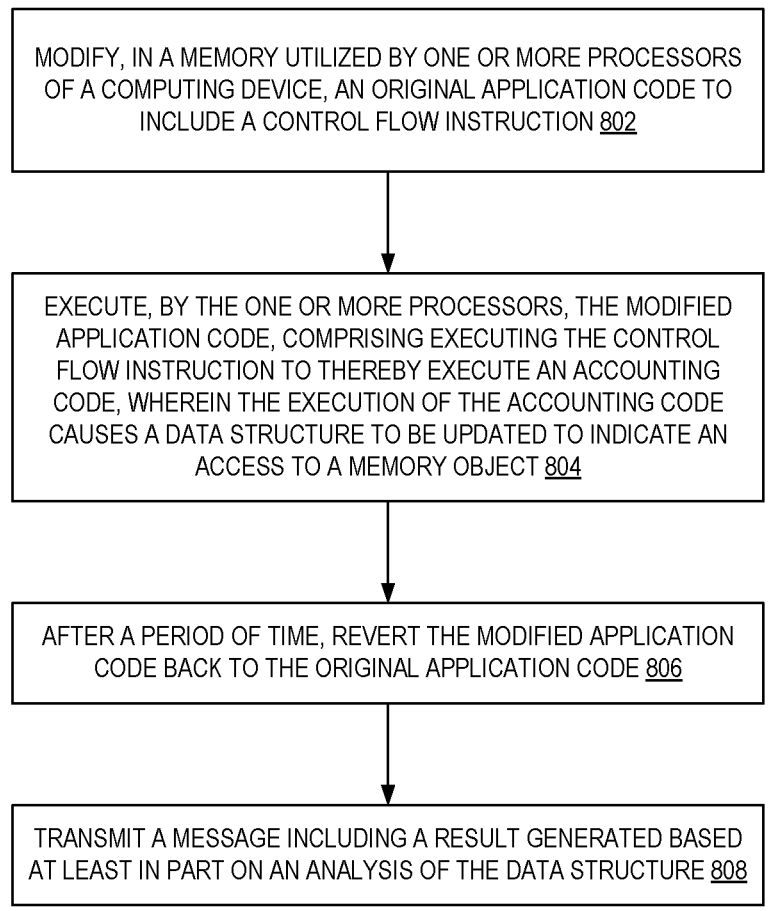
FIG. 8 is a flow diagram illustrating operations of a method for resource leak detection according to some examples.

FIG. 8 is a flow diagram illustrating operations 800 of a method for resource leak detection according to some examples. Some or all of the operations 800 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by one or more processors 124 (e.g., a control processor) of the other figures.

The operations 800 include, at block 802, modifying, in a memory utilized by one or more processors of a computing device, an original application code to include a control flow instruction. The application code may be read from a single set of memory locations by multiple processors, e.g., as part of transmitting and receiving network traffic (e.g., packets) to and from compute instances (e.g., virtual machines) executed by the computing device. In some examples, the one or more processors comprise a plurality of processor cores, and wherein the processing operation includes at least one of sending or receiving network traffic.

In some examples, the modifying of the original application code occurs while the one or more processors continue to utilize at least some of the original application code as part of their processing operation.

In some examples, the original application code includes a no-op instruction; the modifying includes replacing the no-op instruction with the control flow instruction; and the control flow instruction comprises an unconditional branch instruction. The no-op instruction may have been inserted into the application code when it was compiled, for example. The unconditional branch instruction can be, for example, a "jump" type instruction (referencing a label or memory address) that causes execution to continue at a different, non-sequential memory location corresponding to the referenced label or address.

The operations 800 further include, at block 804, executing, by the one or more processors, the modified application code, comprising executing the control flow instruction to thereby execute an accounting code, wherein the execution of the accounting code causes a data structure to be updated to indicate an access to a memory object. For example, the accounting code may be entered just before or after an access to a particular memory object (e.g., a buffer) and the accounting code may cause the data structure to be indicated to reflect that the access, to that particular memory object or location(s), occurred. As one example, the data structure can be a bitmap where each bit corresponds to another particular memory object/memory location (or set thereof).

The operations 800 further include, at block 806, after a period of time, reverting the modified application code back to the original application code. The period of time may be static (e.g., after one second, two seconds, one minute, or the like), or may be due to the initiation of an event causing the reverting.

The operations 800 further include, at block 808, transmitting a message including a result generated based at least in part on an analysis of the data structure. For example, the result may indicate whether any lost memory objects or locations were found, and/or metadata associated with the accounting. The result may also include a token that is a hash or compressed version of the data structure. The transmission may within the computing device (e.g., from a processor to another processor) or may be sent off a computing device to another (e.g., from a processor to another system via a network).

In some examples, the operations 800 further include determining, based on the result, that a memory leak exists; and causing display of a user interface indicating that the memory leak exists. The determining may include determining whether the data structure (represented by the result) indicates whether any memory objects were not accessed during the period of time in which modified code existed, which may reflect that a particular memory object (location) was no longer being used.

In some examples, the modifying and reverting are part of a first accounting and occur responsive to receipt of a first request to perform the first accounting. In some examples, the operations 800 further include receiving a second request to perform a second accounting, the second request including a token associated with the result from the first accounting. In some examples, the operations 800 further include performing the second accounting, which can include: again modifying, in the memory utilized by one or more processors of a computing device, the original application code to include the control flow instruction; after another period of time, reverting the modified application code back to the original application code; after the reverting, obtaining another representation of the data structure; and determining whether the token is equivalent to the another representation of the data structure. In some examples, the operations 800 further include, upon determining that the token is equivalent to the another representation of the data structure, performing a recovery procedure associated with one or more memory objects. In some examples, the recovery procedure includes updating a second data structure to indicate that the one or more memory objects are available.

In some examples, the modifying, executing, reverting, and transmitting are performed by an offload card of a computing device in a cloud provider network, wherein the offload card comprises one or more physical network interfaces, and wherein the memory object comprises a buffer utilized for packet processing operations.

Figure 9:
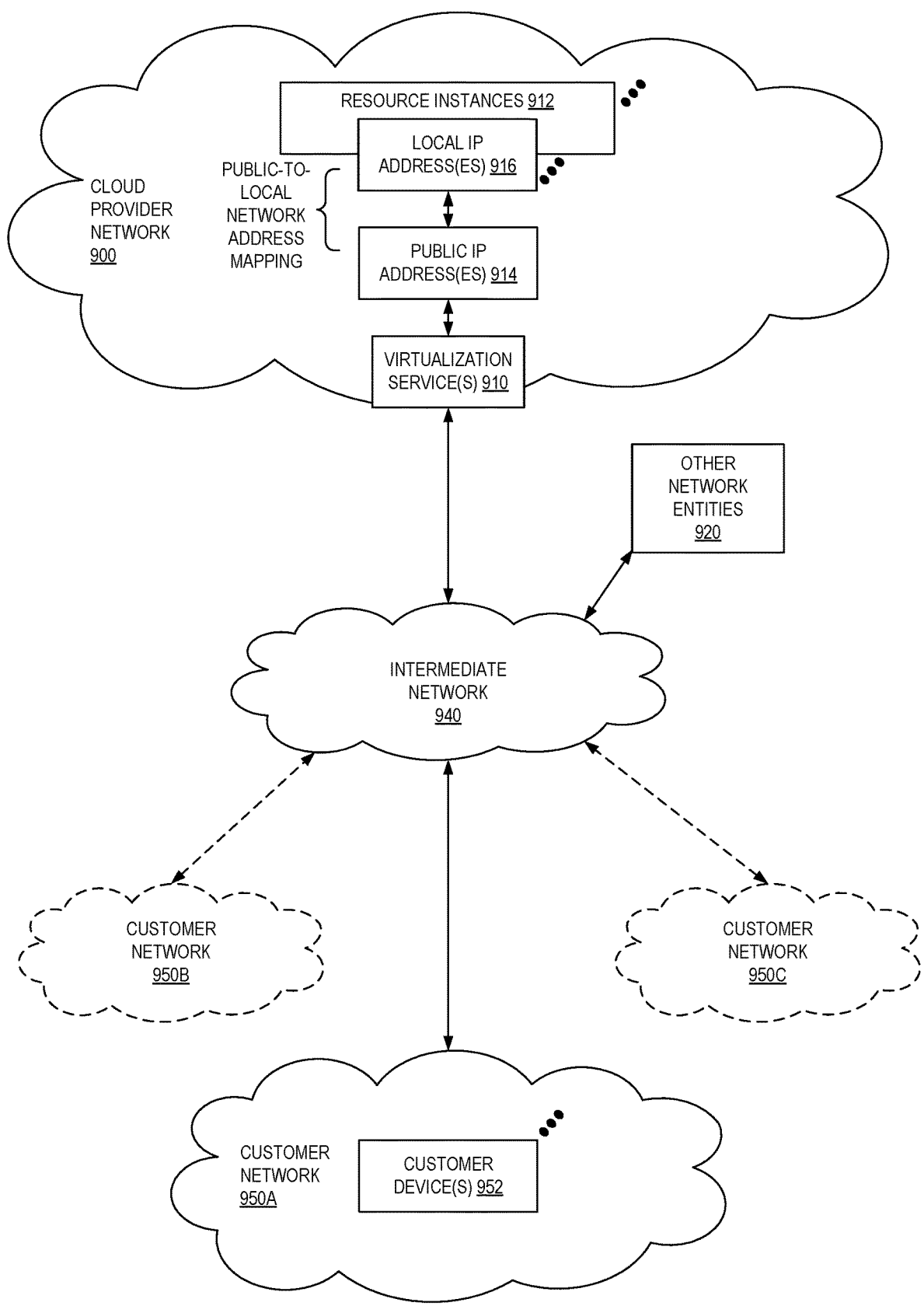
FIG. 9 illustrates an example cloud provider network environment according to some examples.

FIG. 9 illustrates an example provider network (or "service provider system") environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
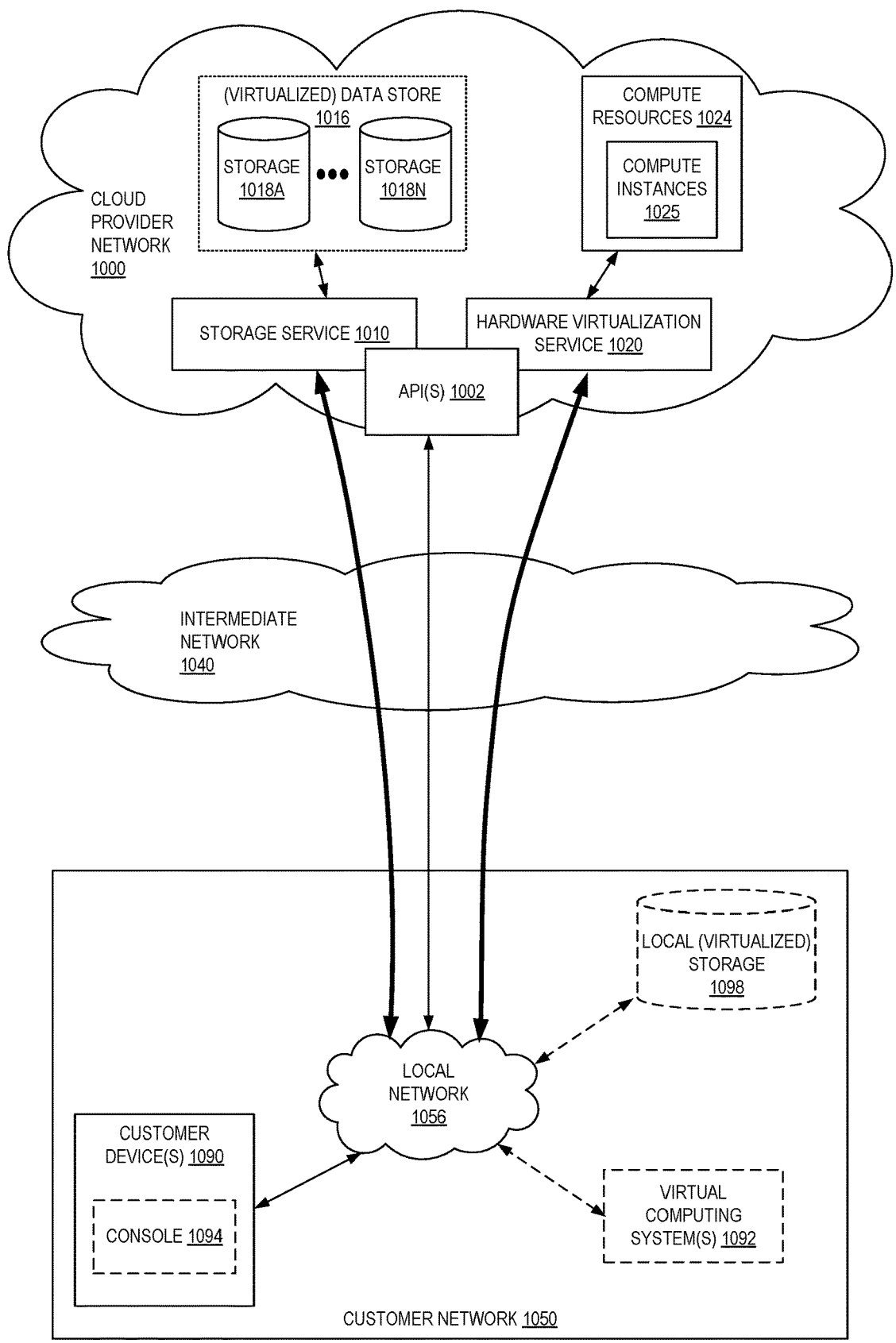
FIG. 10 is a block diagram of an example cloud provider network that provides a storage service and a hardware virtualization service to customers according to some examples.

FIG. 10 is a block diagram of an example provider network environment that provides a storage service and a hardware virtualization service to customers, according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Illustrative Systems

Figure 11:
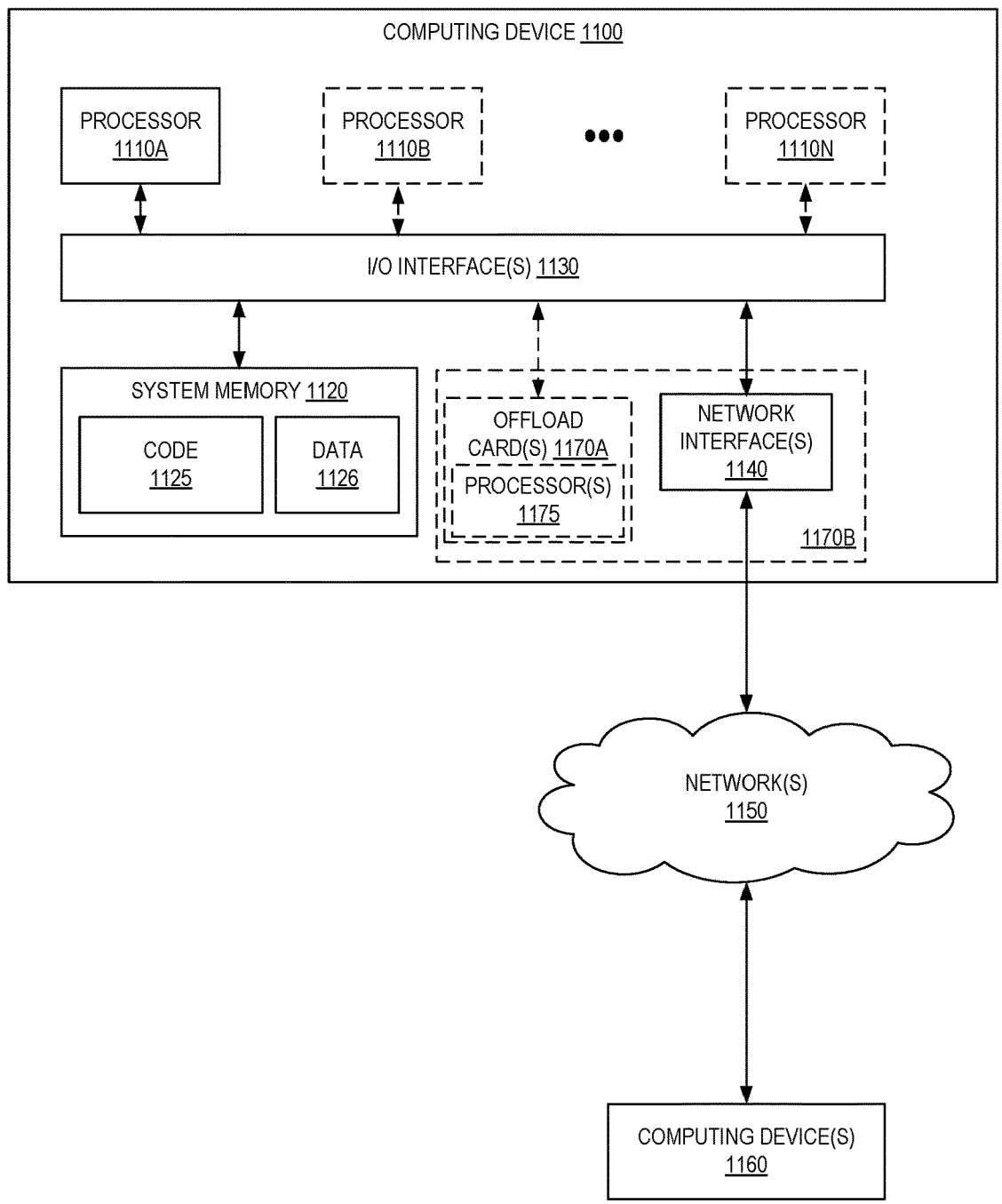
FIG. 11 is a block diagram illustrating an example computing device that can be used in some examples.

In some examples, a system that implements a portion or all of the techniques described herein can include a general-purpose computer system, such as the computing device 1100 (also referred to as a computing system or electronic device) illustrated in FIG. 11, that includes, or is configured to access, one or more computer-accessible media. In the illustrated example, the computing device 1100 includes one or more processors 1110 coupled to a system memory 1120 via an input/output (I/O) interface 1130. The computing device 1100 further includes a network interface 1140 coupled to the I/O interface 1130. While FIG. 11 shows the computing device 1100 as a single computing device, in various examples the computing device 1100 can include one computing device or any number of computing devices configured to work together as a single computing device 1100.

In various examples, the computing device 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as code 1125 (e.g., executable to implement, in whole or in part, the control plane components 112, hardware virtualization service 108, processors 124, etc.) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computing device 1100 and other computing devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computing device 1100. However, in some examples the virtualization manager implemented by the offload card(s) 1170A or 1170B can accommodate requests from other entities (e.g., from compute instances themselves), and cannot coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary.

Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    receiving, at a computing device, a request to perform an accounting of a set of memory objects utilized within the computing device by processors of the computing device;
    modifying, in a memory utilized by the processors, an original application code to include a control flow instruction, wherein the modifying includes replacing a no-op instruction with an unconditional branch instruction;
    executing, by the processors, the modified application code, comprising executing the unconditional branch instruction to thereafter execute an accounting code, wherein the execution of the accounting code causes a data structure to be updated to indicate an access to a memory object from the set of memory objects, wherein the data structure comprises a bitmap with bit locations corresponding to locations of memory objects;
    after a period of time, reverting the modified application code back to the original application code; and
    transmitting a message including a result generated based at least in part on an analysis of the data structure.

2. The computer-implemented method of claim 1, further comprising:
    determining, based on the result, that a memory leak exists.

3. The computer-implemented method of claim 2, further comprising:
    rolling back the original application code to an earlier version of the original application code known to not include the memory leak; or
    halting a deployment of the original application code to other computing devices; or
    rolling back a deployment of the original application code to other computing devices.

4. A computer-implemented method comprising:
    modifying, in a memory utilized by one or more processors of a computing device, an original application code to include a control flow instruction;
    executing, by the one or more processors, the modified application code, comprising executing the control flow instruction to thereby execute an accounting code, wherein the execution of the accounting code causes a data structure to be updated to indicate an access to a memory object;
    after a period of time, reverting the modified application code back to the original application code; and
    transmitting a message including a result generated based at least in part on an analysis of the data structure.

5. The computer-implemented method of claim 4, further comprising:
    determining, based on the result, that a memory leak exists; and
    causing display of a user interface indicating that the memory leak exists.

6. The computer-implemented method of claim 4, wherein the modifying of the original application code occurs while the one or more processors continue to utilize at least some of the original application code as part of their processing operation.

7. The computer-implemented method of claim 6, wherein the one or more processors comprise a plurality of processor cores, and wherein the processing operation includes at least one of sending or receiving network traffic.

8. The computer-implemented method of claim 4, wherein:
the original application code includes a no-op instruction;
the modifying includes replacing the no-op instruction with the control flow instruction; and
the control flow instruction comprises an unconditional branch instruction.

9. The computer-implemented method of claim 4, wherein the modifying and reverting are part of a first accounting and occur responsive to receipt of a first request to perform the first accounting.

10. The computer-implemented method of claim 9, further comprising:
receiving a second request to perform a second accounting, the second request including a token associated with the result from the first accounting, wherein the token comprises a representation of the data structure.

11. The computer-implemented method of claim 10, further comprising performing the second accounting, comprising:
again modifying, in the memory utilized by one or more processors of a computing device, the original application code to include the control flow instruction;
after another period of time, reverting the modified application code back to the original application code;
after the reverting, obtaining another representation of the data structure; and
determining whether the token is equivalent to the another representation of the data structure.

12. The computer-implemented method of claim 11, further comprising:
upon determining that the token is equivalent to the another representation of the data structure, performing a recovery procedure associated with one or more memory objects.

13. The computer-implemented method of claim 12, wherein the recovery procedure includes updating a second data structure to indicate that the one or more memory objects are available.

14. The computer-implemented method of claim 4, wherein the modifying, executing, reverting, and transmitting are performed by an offload card of a computing device in a cloud provider network, wherein the offload card comprises one or more physical network interfaces, and wherein the memory object comprises a buffer utilized for packet processing operations.

15. A system comprising:
a memory of a computing device;
a plurality of processor cores of the computing device operating as worker processors executing an application, wherein the execution of the application involves utilizing the memory device; and
a processor core of the computing device operating as a control processor, the computing device including instructions that upon execution by the control processor cause the control processor to:
cause an original application code stored in the memory to be modified to include a control flow instruction, wherein the worker processors, upon executing the control flow instruction, begin execution of an accounting code, wherein the execution of the accounting code causes a data structure to be updated to indicate an access to a memory object;
after a period of time, cause the modified application code to be reverted back to the original application code; and
transmit a message including a result generated based at least in part on an analysis of the data structure.

16. The system of claim 15, further comprising:
one or more computing devices implementing a control plane, the control plane including instructions which when executed cause the control plane to:
determine, based on the result, that a memory leak exists; and
cause display of a user interface indicating that the memory leak exists.

17. The system of claim 15, wherein the modification of the original application code occurs while the worker processors continue to utilize at least some of the original application code as part of their processing operation.

18. The system of claim 17, wherein the worker processors comprise a plurality of processor cores, and wherein the processing operation includes at least one of sending or receiving network traffic.

19. The system of claim 15, wherein:
the original application code includes a no-op instruction;
the modification includes a replacement of the no-op instruction with the control flow instruction; and
the control flow instruction comprises an unconditional branch instruction.

20. The system of claim 15, wherein the modification and reverting are part of a first accounting and occur responsive to receipt of a first request to perform the first accounting.

* * * * *